United States Patent [19]

Miura et al.

[11] Patent Number: 4,521,358
[45] Date of Patent: Jun. 4, 1985

[54] PROCESS FOR THE PRODUCTION OF SILICON NITRIDE SINTERED BODIES

[75] Inventors: Kazunori Miura; Yoshinori Hattori; Yasushi Matsuo, all of Aichi, Japan

[73] Assignee: Agency of Industrial Science & Technology, Tokyo, Japan

[21] Appl. No.: 521,283

[22] Filed: Aug. 8, 1983

[30] Foreign Application Priority Data

Aug. 12, 1982 [JP] Japan .............................. 57-139149
Aug. 12, 1982 [JP] Japan .............................. 57-139150

[51] Int. Cl.$^3$ ............................................ C04B 35/58
[52] U.S. Cl. ...................................... 264/65; 501/97
[58] Field of Search ...................... 501/97, 92; 264/65

[56] References Cited

U.S. PATENT DOCUMENTS

| | | | |
|---|---|---|---|
| 4,004,937 | 1/1977 | Masaki | 501/97 |
| 4,097,293 | 6/1978 | Komeya et al. | 501/92 |
| 4,280,850 | 7/1981 | Smith et al. | 501/97 |
| 4,332,909 | 6/1982 | Nishida et al. | 501/97 |
| 4,440,707 | 4/1984 | Shimamori et al. | 501/97 |

*Primary Examiner*—Mark Bell

*Attorney, Agent, or Firm*—Sughrue, Mion, Zinn, Macpeak & Seas

[57] ABSTRACT

Processes for the production of a silicon nitride sintered body are disclosed. One process comprises molding a mixed powder of 100 parts by weight of metallic silicon with a maximum particle size of 20 μm or less and 0.2 to 2 parts by weight (calculated as chromium oxide) of a chromium component and, thereafter, reaction sintering the mold in a nitrogen gas or in a non-oxidizing atmosphere containing nitrogen gas at a temperature of 1,300° to 1,500° C. This invention provides further process which comprises molding a mixed powder of 100 parts by weight of metallic silicon with a maximum particle size of 20 μm or less, 0.2 to 1 part by weight (calculated as chromium oxide) of a chromium component, and further 10 to 20 parts by weight of an oxide component of one or more of the oxides of yttrium, lanthanum, cerium, gadolinium, and erbium, reaction sintering the above-prepared mold, and thereafter, hot pressing the reaction sintered body. This silicon nitride hot pressed body is superior in oxidation resistance, and moreover is of high density and has high mechanical strength. Thus it is suitable for use as, e.g., gas turbine parts of diesel engine parts.

7 Claims, 2 Drawing Figures

PROCESS FOR THE PRODUCTION OF SILICON NITRIDE SINTERED BODIES

FIELD OF THE INVENTION

The present invention relates to a process for producing silicon nitride sintered bodies which have a high mechanical strength, are superior in oxidation resistance, and are of high density.

BACKGROUND OF THE INVENTION

Silicon nitride ($Si_3N_4$) sintered bodies are superior in various characteristics such as mechanical strength, heat resistance and corrosion resistance and thus can be used as high temperature structural material, e.g., in the production of gas turbine parts.

In sintering of silicon nitride, various sintering aids are commonly added to accelerate the sintering process because the sinterabilities of silicon nitride itself are very poor. For example, when silicon nitride sintered bodies are produced by a reaction sintering method, a small amount of oxide layer on the surface of metallic silicon powder inhibits a nitriding reaction. Hence metals of the iron family have been added as sintering aids to accelerate the nitridation or to allow the nitriding reaction to proceed smoothly.

Iron is effective in removing the oxide layer on the surface of metallic silicon powder. Moreover, it acts as a useful nitriding accelerator; i.e., at temperatures above 1,200° C., it reaches with metallic silicon to form a liquid phase $FeSi_2$, thereby accelerating the nitriding reaction. However, the silicon nitride formed is mainly the $\beta$-phase type which is formed by the action of the liquid phase of $FeSi_2$. The $\alpha$-phase content of the final sintered body is as low as about 50% by weight. As is well known, the strength of the silicon nitride sintered body increases with an increase in the $\alpha$-phase content. Hence the addition of iron as a nitriding accelerator is not preferred.

Sintering aids added usually remain in the grain boundary phase of sintered bodies. Thus the properties of the oxide layer resulting from oxidation of the sintered bodies greatly vary with the type of sintering aid.

Several reports have been presented on the oxidation mechanism of silicon nitride sintered bodies containing sintering aids other than metals of the iron family. Typical examples of such sintering aids are explained below.

When yttrium oxide is used as a sintering aid, above critical temperature (about 1,200° C.) of the reaction, the diffusion of oxygen passing through an oxide layer is a rate-determining stage, and as the composition of the oxide layer comes close to pure silicon dioxide, the oxidation rate constant becomes small. Although the surface of oxide layer is smooth and free of pores, and the oxide layer is in intimate contact with a base material, cooling results in the formation of cracks between the oxide layer and the base material due to the difference in coefficient of thermal expansion therebetween.

When magnesium oxide is used as a sintering aid, the diffusion of magnesium ions from a base material to an oxide layer is a rate-determining stage. In this case, the rapid diffusion of oxygen through the oxide layer and the pores formed by release of the oxidation product, nitrogen gas, from the sample leads to more increase the weight gain after oxidation and more degradation in strength after oxidation as compared with the case in which yttrium oxide is used as a sintering aid.

The nitriding-accelerating mechanism or oxidation mechanism, as described above, varies with the type of the sintering aid used. It is also greatly influenced by the amount of the sintering aid. Hence, various attempts have been made to remove an oxide layer formed by oxidation and to improve the characteristics of the oxide layer by changing the type and amount of the sintering aid. Nevertheless, sintered bodies having satisfactory performance have not yet been produced.

SUMMARY OF THE INVENTION

As a result of various investigations to produce silicon nitride sintered bodies having improved oxidation resistance particularly in connection with a sintering method and the type of a sintering aid, it has been found that: (1) a reaction sintered body produced by adding a chromium component in place of iron to metallic silicon possesses uniform composition and structure such that the amount of residual silicon is small, and the $\alpha$-$Si_3N_4$ content is high. These characteristics have heretofore been difficult to realize. These characteristics make the composition suitable as a heat-resistant high temperature member. It has also been found that: (2) a silicon nitride sintered body produced by adding a certain oxide component as a sintering aid in combination with a chromium component to metallic silicon in the respective predetermined amounts, reaction sintering the mixture, and then again sintering the thus-prepared reaction sintered body for the purpose of further densification thereof is superior in oxidation resistance and moreover has high density and high mechanical strength, and thus is more suitable as a heat-resistant high temperature member.

The above described characteristic and others are obtained by the present invention which relates to:

(1) a process for producing a silicon nitride reaction sintered body which comprises molding a mixed powder comprising metallic silicon having a maximum particle size of 20 $\mu$m or less and a chromium component, the amount of the chromium component being from 0.2 to 2 parts by weight (calculated as chromium oxide) per 100 parts by weight of the metallic silicon, and reaction sintering the mold in a nitrogen gas or in a non-oxidizing atmosphere containing nitrogen gas at a temperature of from 1,300° to 1,500° C.; and (2) a process for producing a silicon nitride sintered body which comprises adding from 10 to 20 parts by weight of an oxide component consisting of one or more of the oxides of yttrium, lanthanum, cerium, gadolinium, and erbium and from 0.2 to 1 part by weight (calculated as chromium oxide) of a chromium component to 100 parts by weight of metallic silicon having a maximum particle size of 20 $\mu$m or less, reaction sintering the mixture in nitrogen or in a non-oxidizing atmosphere containing nitrogen at a temperature of from 1,300° to 1,500° C. and hot-pressing the reaction sintered body.

DETAILED DESCRIPTION OF THE INVENTION

Figure 1:
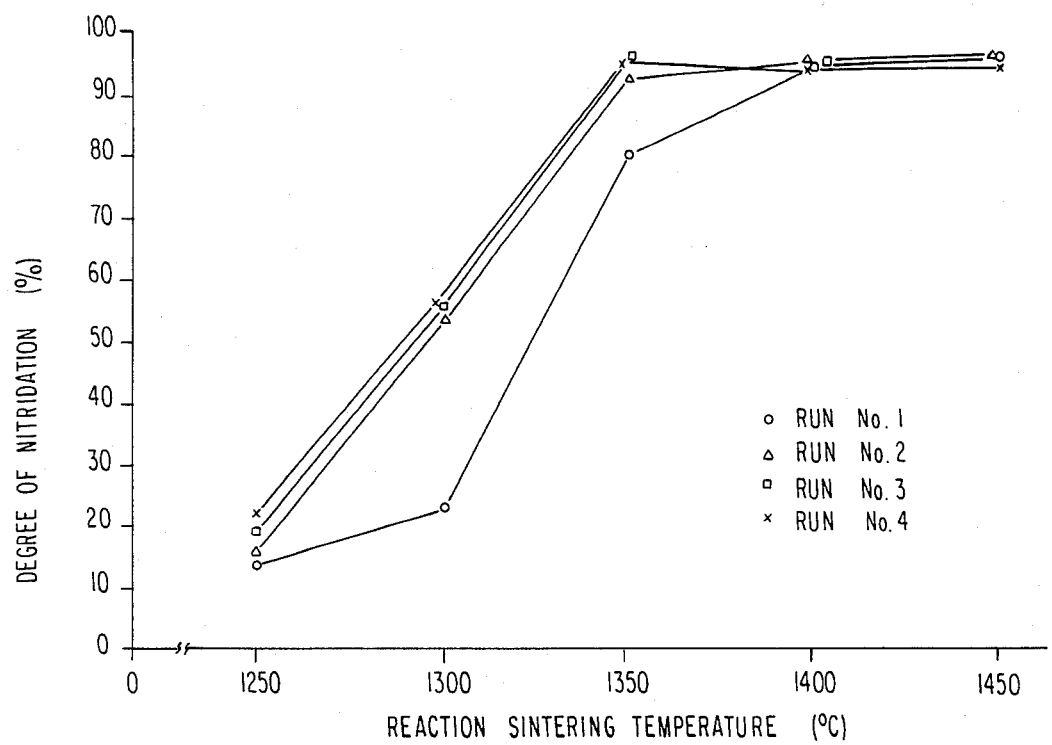
FIG. 1 is a graph showing the relation between a reaction sintering temperature (°C) and a degree of nitridation (%)

The present invention will hereinafter be explained in detail.

In the above described embodiment (1) of the invention in which metallic silicon, a chromium component, and a nitrogen gas component are used as starting materials, the amount of the chromium component being added is from 0.2 to 2 parts by weight (calculated as chromium oxide) per 100 parts by weight of the metallic silicon. Generally the amount of the chromium component being added is from 0.5 to 2 parts by weight (calculated as chromium oxide) per 100 parts by weight of the metallic silicon. In this case, the chromium content of the final silicon nitride after the reaction sintering process is from 0.3 to 1.2% by weight based on the total weight of the silicon nitride sintered bodies.

It has been found that the chromium component contributes greatly to the improvement in oxidation resistance of the final silicon nitride sintered body.

Even when the amount of the chromium component being added is 0.2 part by weight (calculated as chromium oxide) per 100 parts by weight of the metallic silicon, the effect on acceleration of the nitridation can be obtained. This effect, however, is obtained to a lesser degree when the amount of the chromium component being added is less than 0.5 part by weight (calculated as chromium oxide) per 100 parts by weight of the metallic silicon; i.e., the chromium content of the final silicon nitride sintered body is less than 0.3% by weight. On the other hand, if the amount of the chromium component being added is more than 2 parts by weight (caluculated as chromium oxide) per 100 parts by weight of the metallic silicon; i.e., the chromium content of the final silicon nitride sintered body is more than 1.2% by weight, the effect of acceleration of nitridation can be obtained, but the strength of the reaction sintered body tends to drop. The maximum particle size of the metallic silicon powder must be 20 $\mu$m or less. If the maximum particle size is more than 20 $\mu$m, unreacted metallic silicon remains even if the chromium component is added. In connection with the chromium component, it is preferred for the maximum particle size to be 20 $\mu$m or less. If the particle size of the chromium component exceeds 20 $\mu$m, it is not possible to disperse the chromium component uniformly, and the effect of adding the chromium component is reduced.

In producing the silicon nitride reaction sintered body of the invention using the above-described metallic silicon, chromium component and nitrogen gas component, the chromium component is added to the metallic silicon in a proportion of from 0.2 to 2 parts by weight (calculated as chromiun oxide) per 100 parts by weight of the metallic silicon. The resulting mixture is then ground in a ball mill, for example, and molded in a desired form. Then the mold thus prepared is reaction sintered. It is necessary for the reaction sintering process to be performed in a nitrogen gas or in a non-oxidizing atmosphere of a mixed gas of nitrogen and ammonia, inert gas, hydrogen or the like at a temperature of from 1,300° to 1,500° C., more preferably from 1,350° to 1,450° C. If the temperature is lower than 1,350° C., unreacted metallic silicon remains, whereas if it is higher than 1,450° C., the $\beta$-phase content of the silicon nitride formed tends to increase.

It has been found, as described above, that if the sintering aid to accelerate nitridation is added to metallic silicon in the specific proportion and the resulting mixture is sintered in combination with nitrogen gas, a novel silicon nitride sintered body can be obtained in which the quality is uniform and the $\alpha$-component content is high.

Although the mechanism or reason for the effect as obtained by adding the chromium component is not fully understood, it is considered as follows:

The chromium component crystallizes glassy $SiO_2$ on the surface of metallic silicon powder, causing cracks to be formed in the $SiO_2$ layer and thus allowing $SiO_2$ gas, a reaction product of metallic silicon and $SiO_2$, to escape through the cracks. Once this reaction occurs, it continues to proceed until the $SiO_2$ is completely consumed, while causing the formation of cracks. As a result, the surface of the metallic silicon is maintained in a very clean condition and the nitriding reaction occurs easily on the surface. Moreover, the chromium component does not easily form a liquid phase on reacting with metallic silicon. In this case, therefore, the formation of $\beta$-$Si_3N_4$ is prevented compared with the case in which iron is added.

In the above described embodiment (2) the metallic silicon, an oxide component of one or more of the oxides of yttrium, lanthanum, cerium, gadolinium, and erbium, a chromium component exemplified by chromium oxide, and a nitrogen gas component are used. The oxide component and the chromium component are used in combination as a sintering aid, producing the synergistic effect that both the oxidation resistance and mechanical strength are greatly increased.

The oxide component excluding the chromium component acts as a sintering aid at the time of hot pressing. It is necessary for the oxide component to be added in an amount of from 10 to 20 parts by weight per 100 parts by weight of the metallic silicon. If the amount of the oxide component exceeds the upper limit, the mechanical strength is low and the oxidation resistance is poor, although the density is good. On the other hand, if it is below the lower limit, the density is inferior and the mechanical strength lowers.

The chromium component is considered to have, in addition to the effect of acceleration of nitriding as described above, the following effect:

The chromium component accelerates crystallization of the oxide of yttrium, lanthanum, cerium, gadolinium or erbium and the glass-like compound of silicon dioxide, resulting from oxidation of the hot pressed body, and prevents the formation of cracks in the oxide layer of the hot pressed body, thereby increasing the oxidation resistance. In this case, it is necessary for the chromium component to be added in an amount (calculated as chromium oxide) of from 0.2 to 1 part by weight per 100 parts by weight of the metallic silicon.

If the amount of the chromium component being added is less than 0.2 part by weight (calculated as chromium oxide), the effect of acceleration of nitridation is decreased, and moreover, the crystallization of the oxide of yttrium, lanthanum, cerium, gadolinium, and erbium and the glass-like compound of silicon dioxide is reduced. The effects of acceleration of nitridation and of crsytallization are hardly increased or remain unchanged even if the chromium component is added in greater amounts. However, if the amount of the chromium component being added is too large, the mechanical strength of the hot press sintered body falls. Therefore, when the hot pressing is used in combination, is preferably the amount of the chromium component being added up to 1 part by weight (calculated as chromium oxide).

In the process of the invention, metallic silicon powder (and not silicon nitride) is used as a starting material, and the metallic silicon powder is subjected to a nitriding treatment. The reasons for this are as follows: (1) Silicon nitride particles formed by the nitriding treatment are superior in sintering properties since they are finer than silicon nitride particles commercially available, and moreover, their grain sizes are relatively uniform. (2) Oxygen always exists on the surface of silicon nitride powder, and the amount of oxygen contained in the silicon nitride formed by subjecting metallic silicon to the nitriding treatment is much less than that of the oxygen existing on the surface of silicon nitride powder. As a result, the properties of the grain boundary phase of the sintered body are superior to those in the case where silicon nitride powder is used as a starting material.

The metallic silicon powder as used herein must have a maximum particle size of 20 μm or less even when hot pressing is used in combination. If the maximum particle size is more than 20 μm, unreacted metallic silicon remains even if chromium oxide to accelerate the nitriding reaction is added at the nitriding treatment. The unreacted metallic silicon is responsible for defects in the sintered body obtained by performing the hot pressing.

In producing the silicon nitride sintered body of the invention using the above-described metallic silicon, chromium component, oxide component, and nitrogen gas component, the oxide component of one or more of the oxides of yttrium, lanthanum, cerium, gadolinium, and erbium, which has been finely ground, is added as a sintering aid to metallic silicon in an amount of from 10 to 20 parts by weight per 100 parts by weight of the metallic silicon, and also, the chromium component which has been finely ground is added in an amount (calculated as chromium oxide) of from 0.2 to 1 part by weight per 100 parts by weight of the metallic silicon. The resulting mixture is ground in a ball mill, for example, and when molded, is molded in a desired from by application of a pressure of from about 2,000 to 5,000 kg/cm². The mold is then reaction sintered in a non-oxidizing atmosphere of nitrogen gas or a mixed gas of nitrogen and ammonia, inert gas, hydrogen or the like at a temperature of from 1,300° to 1,500° C., preferably from 1,350° to 1,450° C. and, thereafter, is subjected to hot pressing. This hot pressing is sufficient if performed under the conditions of temperature of from 1,600° to 1,900° C., pressure of from 100 to 500 kg/cm² (preferably from 200 to 400 kg/cm²), and in a non-oxidizing atmosphere, such as a reducing atmosphere and a neutral atmosphere.

Between the above described embodiments (1) and (2), the embodiment (2) is more preferred.

In accordance with the process of the invention, as described above, the chromium component or a mixture of the chromium component and the oxide component is added as a sintering aid to metallic silicon in a specific amount to produce the desired sintered body. The thus-produced sintered body is superior in oxidation resistance and moreover is of high density and has a high mechanical strength because of its novel composition. Hence the sintered body is suitable for use as, e.g., gas turbine parts or diesel parts, for which heat resistance and oxidation resistance are required.

The present invention is described in greater detail by reference to the following examples. It is to be noted that these examples are illustrative, and the present invention is not limited thereto except as indicated in the appended claims.

EXAMPLE 1

Metallic silicon powder (maximum particle size: 15 μm; mean particle size: 3.5 μm) and chromium oxide powder (maximum particle size: 18 μm; mean particle size: 6 μm) were mixed in the ratio as shown in Table 1 and the resulting mixture was then molded under a molding pressure of 5,000 kg/cm² by the use of a hydrostatic press. Separate samples of the mold thus obtained were reaction sintered by maintaining at a maximum temperature of 1,350° C., 1,400° C. and 1,450° C. for 8 hours in a flow of nitrogen. For comparison, the molds were reaction sintered at a temperature of 1,250° C. and 1,300° C.

Figure 2:
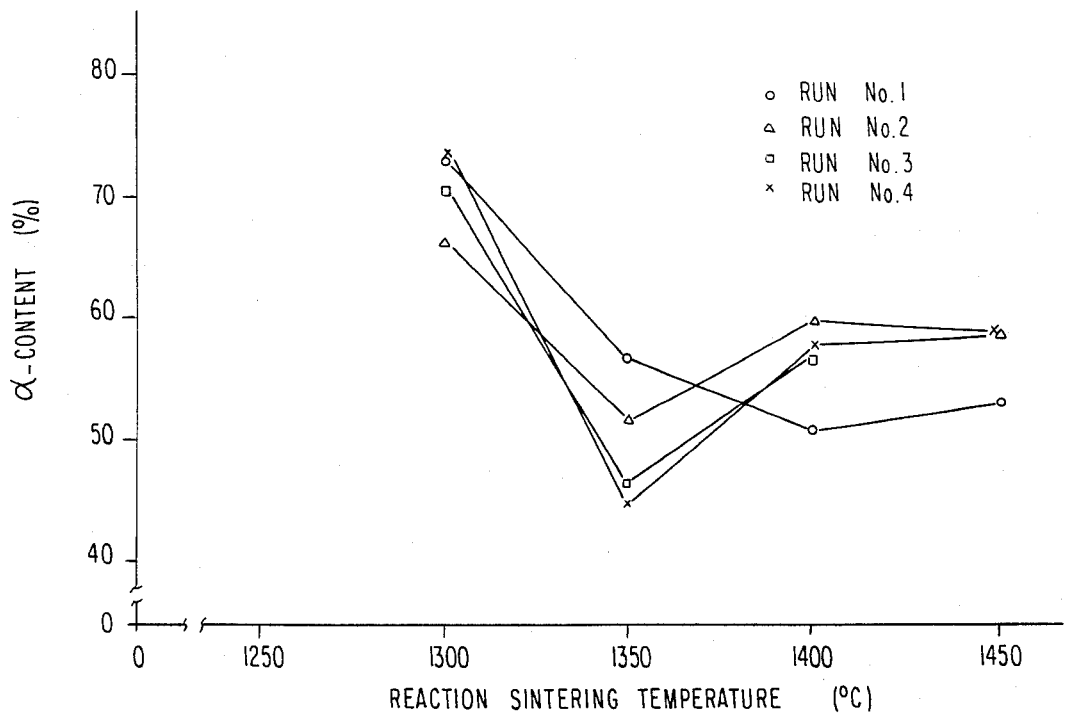
FIG. 2 is a graph showing the relation between a reaction sintering temperature (°C) and an $\alpha$-content (%).

The characteristics of each reaction sintered body are shown in FIGS. 1 and 2. FIG. 1 shows the relation between the reaction sintering temperature and the degree of nitridation. The degree of nitridation was calculated by the following equation:

$$\text{Degree of Nitridation} = \frac{\text{Measured Weight Increase}}{\text{Calculated Weight Increase by Nitriding Reaction}} \times 100(\%)$$

FIG. 2 shows the relation between the reaction sintering temperature and the α-content. The α-content was calculated from the following equation:

$$\alpha\text{-Content} = \frac{I\alpha}{I\alpha + I\beta} \times 100(\%)$$

(wherein $I\alpha$ is a mean peak intensity of (102) and (210) of X-ray diffraction peaks of 60 -$Si_3N_4$, and $I\beta$ is a mean peak intensity of (101) and (210) of X-ray diffraction peaks of $\beta$-$Si_3N_4$.

TABLE 1

| Run No. | | Metallic Silicon (parts by weight) | Chromium Oxide (parts by weight) |
|---|---|---|---|
| 1 | (Comparative Example) | 100 | 0 |
| 2 | (Example of the Invention) | 100 | 0.5 |
| 3 | (Example of the Invention) | 100 | 1 |
| 4 | (Example of the Invention) | 100 | 2 |

It can be seen from FIG. 1 that in Run Nos. 2, 3 and 4 in which chromium oxide was added in an amount of 0.5, 1 and 2 parts by weight, respectively, per 100 parts by weight of metallic silicon, the nitriding reaction at 1,300° and 1,350° C. was greatly accelerated compared with Run No. 1 (Comparative Example) in which chromium oxide was not added.

Usually the calculated degree of nitridation does not reach 100% and is about 95% at most, since a part of the sample evaporates at the reaction sintering step. Hence it is understood that in Run Nos. 2 to 4 in which chromium oxide was added, the samples were almost completely nitrided at a temperature of 1,350° C. In the case of Run No. 1 in which chromium oxide was not added, the degree of nitridation exceeds 90% only above 1,400° C. This demonstrates that the reaction sintering temperature could be lowered by 50° C. by adding chromium oxide.

In FIG. 2, the α-content at 1,350° C. in Run No. 1 is higher than those in Run Nos. 2 to 4. This is due to insufficient nitridation. However, at temperatures at which nitridation has been completed, i.e., 1,400° C. and 1,450° C., the α-contents of Run Nos. 2 to 4 are higher than that of Run No. 1.

EXAMPLE 2

Metallic silicon (maximum particle size: 20 μm or less), a chromium component, chromium oxide (mean particle size: 6 μm), and an oxide component, each oxide as shown in Table 2 (mean particle size: 1–5 μm), the chromium and oxide components being added as sintering aids, were mixed in the ratio as shown in Table 2 and ground in a ball mill. The mixture thus prepared was molded under a pressure of 2,000 kg/cm², reaction sintered in a flow of nitrogen at a temperature of 1,400° C., and further hot pressed under the conditions of 1,800° C. and 200 kg/cm² for 2 hours to produce a sintered body. The thus-produced sintered body was measured for a theoretical density ratio and a weight gain of samples after oxidation. The results are shown in Table 2.

The theoretical density ratio was determined by the following equation:

$$\frac{\text{Bulk Density of Sample}}{\text{Theoretical Density}} \times 100 (\%)$$

(wherein the theoretical density is calculated by:

$$\frac{166.5P + x_1 + x_2}{\frac{166.5P}{dSi_3N_4} + \frac{x_1}{dx_1} + \frac{x_2}{dx_2}}$$

where
P = purity of silicon powder (%).
$x_1$, $x_2$ = amount of sintering aid added,
$dSi_3N_4$ = theoretical density of silicon nitride (g/cm²),
$dx_1$, $dx_2$ = density of sintering aid (g/cm³)).

In determining the weight gain of sample after oxidation, a sample was oxidized by allowing it to stand in a static atmosphere at 1,300° C. for 100 hours, and its weight gain was measured.

Comparative samples were prepared in which the chromium component was not added, or the type of the oxide component was changed to those different from the oxides of the invention, and were tested in the same manner as above. The results are shown in Table 2.

TABLE 2

| Run No. | Composition (parts by weight) | | | Evaluation | |
|---|---|---|---|---|---|
| | Metallic Silicon | Oxide | | Chromium Oxide | Theoretical Density Ratio | Weight Gain of Samples after Oxidation |
| 1 | 100 | $Y_2O_3$ | 8 | 0 | 96.4 | 0.25 |
| 2 | 100 | $Y_2O_3$ | 16 | 0 | 100 | 0.36 |
| 3 | 100 | $Y_2O_3$ | 24 | 0 | 100 | 0.41 |
| 4 | 100 | $Pr_6O_{11}$ | 16 | 0.5 | 99.8 | 0.35 |
| 5 | 100 | $Nd_2O_3$ | 16 | 0.5 | 99.6 | 0.63 |
| 6 | 100 | $Dy_2O_3$ | 16 | 0.5 | 92.6 | 0.96 |
| 7 | 100 | $Y_2O_3$ | 16 | 0.5 | 99.5 | 0.19 |
| 8 | 100 | $La_2O_3$ | 16 | 0.5 | 99.9 | 0.33 |
| 9 | 100 | $CeO_2$ | 16 | 0.5 | 99.1 | 0.24 |
| 10 | 100 | $Gd_2O_3$ | 16 | 0.5 | 99.1 | 0.27 |
| 11 | 100 | $Er_2O_3$ | 16 | 0.5 | 96.9 | 0.25 |

Note:
Run Nos. 1 to 6 are comparative examples, and Run Nos. 7 to 11 are examples of the invention.

In Run Nos. 1 to 3 (comparative examples) in which chromium oxide is not used in combination although yttrium oxide ($Y_2O_3$) is used as in Run No. 7, the increase of amount due to oxidation is very large compared with that in Run No. 7. Also, the theoretical density ratio indicating the density of material is unsatisfactorily low in Run No. 1.

Compared with Run Nos. 7 to 11 (examples of the invention) in which yttrium oxide, lanthanum oxide ($La_2O_3$), cerium oxide ($CeO_2$), gadolinium oxide ($Gd_2O_3$) and erbium oxide ($Er_2O_3$) are added each in an amount of 16 parts by weight, Run Nos. 4 to 6 in which equal amounts of praseodymium oxide ($Pr_6O_{11}$), neodymium oxide ($Nd_2O_3$) and dysprosium oxide ($Dy_2O_3$) are used are large in the weight gain of samples after oxidation. In particular, when $Dy_2O_3$ is used, the theoretical density ratio is very low and the weight gain of samples after oxidation is very large.

While the invention has been described in detail and with reference to specific embodiment thereof, it will be apparent to one skilled in the art that various changes and modifications can be made therein without departing from the spirit and scope thereof.

What is claimed is:

1. A process for producing a silicon nitride sintered body which comprises molding a mixed powder of 100 parts by weight of metallic silicon with a maximum particle size of 20 μm or less and 0.2 to 2 parts by weight (calculated as chromium oxide) of a chromium component and, thereafter, reaction sintering the above-prepared mold in a nitrogen gas or in a non-oxidizing atmosphere containing nitrogen gas at temperature of 1,300° to 1,500° C.

2. The process as claimed in claim 1, wherein the mixed powder contains 100 parts by weight of metallic silicon and 0.5 to 2 parts by weight (calculated as chromium oxide) of a chromium components.

3. The process as claimed in claim 1, wherein the reaction sintering temperature is from 1,350° to 1,450° C.

4. A process for producing a silicon nitride sintered body which comprises molding a mixed powder of 100 parts by weight of metallic silicon with a maximum particle size of 20 μm or less, 0.2 to 1 part by weight (calculated as chromium oxide) of a chromium component, and further 10 to 20 parts by weight of an oxide component of one or more of the oxides of yttrium, lanthanum, cerium, gadolinium and erbium, reaction sintering the above-prepared mold in a nitrogen gas or in a non-oxidizing atmosphere containing nitrogen gas, and thereafter, hot pressing the reaction sintered body.

5. A process for producing a silicon nitride reaction sintered body as claimed in claim 2, wherein after carrying out the reaction sintering the mixed powder forms a silicon nitride having a chromium content in the range of from 0.3 to 1.2% by weight.

6. A process for producing a silicon nitride reaction sintered body as claimed in claim 4, wherein the molding of the mixed powder is carried out utilizing a pressure of from about 2,000 to 5,000 kg/cm².

7. A process for producing a silicon nitride reaction sintered body as claimed in claim 4, wherein the hot pressing is carried out at a temperature of from 1,600° C. to 1,900° C. at a pressure of from 100 to 500 kg/cm² in a non-oxidizing atmosphere.

* * * * *